S. W. WIDNEY.
INSTRUMENT FOR MEASURING HARDNESS AND RESILIENCY.
APPLICATION FILED OCT. 21, 1918.
1,408,554.
Patented Mar. 7, 1922.
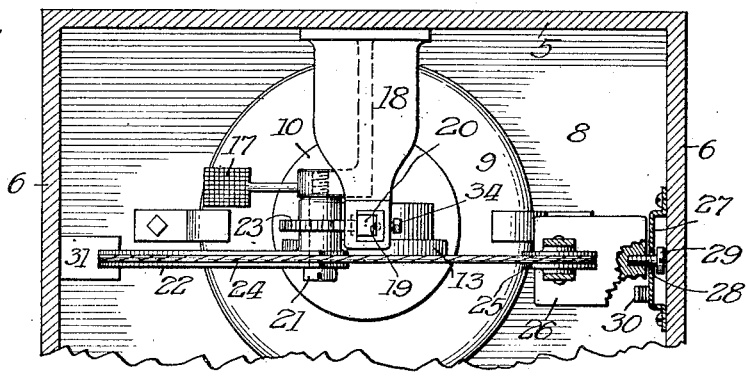
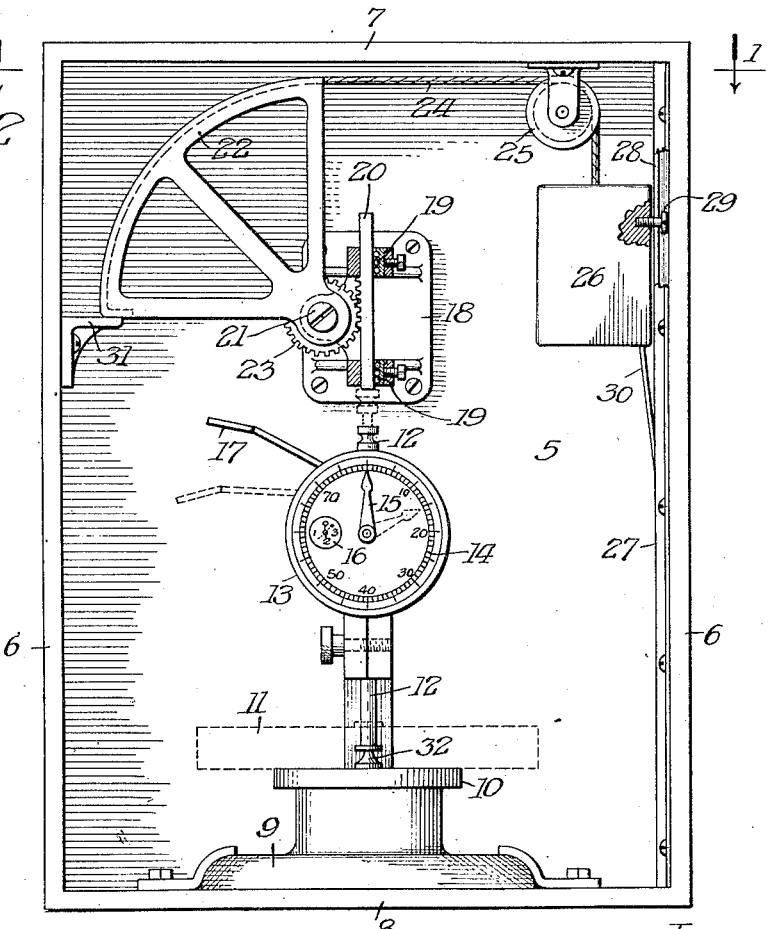
Inventor:
Stanley W. Widney,
By Pond & Wilson
attys.

UNITED STATES PATENT OFFICE.

STANLEY W. WIDNEY, OF CHICAGO, ILLINOIS, ASSIGNOR TO THE WIDNEY COMPANY, OF CHICAGO, ILLINOIS, A CORPORATION OF ILLINOIS.

INSTRUMENT FOR MEASURING HARDNESS AND RESILIENCY.

1,408,554.   Specification of Letters Patent.   Patented Mar. 7, 1922.

Application filed October 21, 1918. Serial No. 259,025.

*To all whom it may concern:*

Be it known that I, STANLEY W. WIDNEY, a citizen of the United States, residing in Chicago, county of Cook, State of Illinois, have invented certain new and useful Improvements in Instruments for Measuring Hardness and Resiliency, of which the following is a specification.

This invention relates to a device primarily designed as a resiliometer, but combining therewith also the function of a sclerometer or sclerescope. The primary purpose of the invention is to provide an accurate and reliable instrument for scientifically determining the thickness, hardness and resiliency of such materials as manufactured felts, rubber, and analogous materials which possess more or less inherent elasticity. Heretofore the determination of these qualities by manufacturers employing these materials in their products has been left largely to guess work, often with very unsatisfactory results since the general appearance and "feel" of such materials may often mislead and deceive even an expert in respect to the above mentioned qualities. It is well known that felt is largely used in the manufacture of certain important parts of piano actions; and the tone effects of such instruments depend quite as largely upon the quality of felt used as upon the quality of strings and other parts that enter into the complete organization of the instrument. So with rubber goods, under modern methods of manufacture it is possible to produce shoddy rubber, that is, rubber manufactured from old rubber waste, and that has all the appearance of new rubber, but it is far below the latter in the qualities of resiliency, elasticity and general durability.

It is manifest that a simple means for quickly and accurately testing the qualities of hardness and resiliency in such materials, and eliminating guess work thereon, is highly desirable, and such a means is provided by my present invention which, in the simple embodiment hereinafter described and shown in the drawing, consists essentially of a direct reading dial type micrometer gage combined with a device whereby both the resistance of the material to compression under pressure (that is, its hardness) and the normal capacity of the material to return toward its original thickness when pressure is released (that is, its resiliency) can be accurately and instantly measured.

The principle of the invention, its mode of use, and the advantages inherent therein will all be readily understood by those skilled in the art of measuring instruments from the following detailed description taken in connection with the accompanying drawing wherein I have illustrated one practical embodiment of the invention which has been found by a thorough test to afford satisfactory results, and in which—

Fig. 1 is a top plan view of the instrument in horizontal section through the supporting case or mounting on line 1—1 of Fig. 2.

Fig. 2 is a front elevation, partly broken out and in section.

Referring to the drawing, 5 designates the rear wall, 6 the side walls and 7 and 8 the top and bottom walls, respectively, of a suitable frame or casing in which the instrument is mounted, and the open front of which may be provided with a hinged door (not shown) if desired. On the bottom wall 8 of the case is mounted a direct reading dial type micrometer gage reading to thousandths of an inch, this gage including a base or pedestal 9 carrying an anvil 10 to support the test material, such as a block or pad of felt indicated by dotted lines at 11, a vertically slidable gage-bar 12, a dial 13 carrying a scale 14 and pointers 15 and 16, and a thumb lever 17 for raising the gage-bar 12 to permit the insertion of the test material 11 on the anvil 10. Since this micrometer gage is a commercial instrument, the detailed construction of which is well known, further description thereof, in its relation to the present invention, is unnecessary.

This micrometer gage is adapted and coordinated to the purpose of the present invention by combining therewith a means for applying a uniform endwise pressure to the upper end of the gage-bar 12 which projects slightly above the dial 13. The means herein shown for this purpose comprises the following instrumentalities: 18 designates a bracket secured to the rear wall 5 of the case and supporting anti-friction bearings 19 for a vertically sliding rack-bar 20 that is directly above and in line with the gage-bar 12. On the bracket 18 is likewise pivoted at 21 a quadrant 22, the pivot shaft of this quadrant carrying a pinion 23 that meshes with the rack-bar 20. To the periphery of the quadrant 22 is attached a cord 24 that leads over a guide pulley 25 suspended from the top wall 7 of the case, and to the lower end of the cord 24 is attached a weight 26 that lies adjacent to one of the side walls 6 of the case. To the inner side of said side wall is attached a sheet metal strip 27 of channel shape that has a central longitudinal slot 28 (Fig. 1); and through this slot is passed a machine screw 29 that is entered into the adjacent side of the weight 26, whereby the slotted strip 27 constitutes a guide for the weight in its descending and rising movements. A tongue 30 cut from the strip 27 is adapted to be sprung outwardly at its upper end so as to form a support for the weight 26 when the latter is in its elevated idle position in a manner clearly shown in Fig. 2. A bracket 31 attached to the opposite side wall 6 constitutes a support or rest for the quadrant 22 when the latter is in its idle position. The lower end of the gage-bar receives a removable presser foot 32 which makes direct contact with the test sample.

In the operation of the instrument, assuming that a block or pad of felt, such as that indicated at 11, is to be tested, the thumb lever 17 is depressed thereby raising the gage-bar and presser foot sufficiently to insert the sample therebeneath on the anvil 10. As soon as the thumb lever is released, the presser foot descends onto the sample under the influence of a light spring contained in the micrometer dial case, and thereupon the tongue 30 which supports the weight 26 is forced inwardly, releasing the weight, which is permitted to descend and through its gravity effect swings the quadrant on its pivot and through the pinion and rack-bar forces the gage-bar and presser foot downwardly causing the latter to compress the test sample. The amount or extent of this compression is read off in thousandths of an inch on the micrometer scale 14. This gives the relative hardness of the material. For instance, if the normal thickness of the test sample were one-quarter of an inch and this corresponded to two revolutions of the pointer 15, and, under the influence of the weight 26 the presser foot compressed the sample to the extent of one complete revolution of the pointer 15, this would mean that the hardness was 50 per cent.

The resiliency or "life" of the material is then determined by raising the weight 26, thus taking the pressure off the gage-bar, and reading on the scale the extent of rising movement of the gage-bar under the reaction of the test sample. In the instance assumed, let it be supposed that the pointer 15 makes one-half of a backward revolution, this would obviously indicate a resiliency of 50 per cent. A backward movement of a quarter of a revolution would indicate a resiliency of 25 per cent, while a backward movement of a complete revolution would indicate a resiliency of 100 per cent. Since the spring pressure in the micrometer itself and the weight 26 are always constant or uniform factors, it is manifest that the readings obtained on testing different samples afford accurate comparative tests of the hardness and resiliency of said samples. From the foregoing it will be manifest that by the use of the instrument herein shown and described it is possible to determine, with respect to any test sample, its exact thickness, its exact hardness, its exact resiliency or "life" and, finally, the ratio between its resiliency and hardness. By adapting the gage-bar to receive different presser feet, it is possible and practicable to subject the material to the same conditions of compression which it meets in the service for which it is intended. For instance, for the specific use of felt manufacturers, hammer manufacturers and piano manufacturers, and for testing hammers to meet different specifications, the instrument may be provided with special presser feet in addition to the ordinary or standard foot, which can be applied when testing hammers from different parts of the piano scale. Each of these additional feet is accurately shaped so that its contact surface corresponds with the number and gage of the piano wire commonly used in the corresponding part of the scale. By using these different presser feet the hardness tests can be made under conditions exactly reproducing those which will exist in service, and the same is true of resiliency tests.

It will be observed that in the construction shown, the weight 26 is a medium for exerting a constant force and that the weight transmitting mechanism is of such a character that this constant force in multiplied amount is uniformly applied to the gage-bar during the full extent of the movement of the latter onto the test sample, thereby avoiding a variable pressure which would render the comparative readings of the instrument on different samples unreliable and valueless in the establishment of a standard. In order to neutralize or offset the slight variable effect due to the shifting of the center of gravity of the quadrant 22 relatively to the axis of pinion 23 as the weight 26 descends, the periphery of the quadrant is not made on the arc of a perfect circle but the radius is gradually shortened very slightly from the vertical to the horizontal end of the quadrant (Fig. 2), thereby gradually decreasing the leverage to the same extent that it is increased by the shifting of the center of gravity. The gravity effect of the quadrant is so slight in comparison with that of the weight 26 that it is practically negligible, but for a high degree of accuracy the quadrant is made with a slightly variable radius as described.

Manifestly the principle of the invention is capable of practical embodiment and use in apparatus differing widely in detail from that herein shown and described. Hence it should be understood that I do not limit the invention to the particular embodiment thereof herein presented for the purpose of explanation and disclosure, but reserve all such variations and modifications as fall within the spirit and purview of the appended claims.

I claim:

1. In an instrument for measuring hardness and resiliency, the combination with a slidable gage-bar adapted to contact with the test material, of a medium for exerting a constant force, means for applying said force in constant and unvarying multiplied amount to said gage-bar during the entire compressive pressure of the latter on the test material, and means for measuring the extent of yield and rebound of said material by said gage-bar.

2. In an instrument for measuring hardness and resiliency, the combination with a sliding gage-bar adapted to contact with the test material, of a weight, means for applying the gravity force of said weight in constant and unvarying multiplied amount to said gage-bar during the entire compressive pressure of the latter on the test material, and means for measuring accurately and positively the extent of yield and rebound of said material by said gage-bar.

3. In an instrument for measuring hardness and resiliency, the combination with a micrometer having an anvil to support a test sample, a vertically movable gage-bar, and a scale actuated by said gage-bar, of a weight, and means for applying the gravity force of said weight in constant and unvarying multiplied amount to the upper end of said gage-bar during the entire compressive pressure of the latter on the test sample.

4. In an instrument for measuring hardness and resiliency, the combination with a micrometer having an anvil to support a test sample, a vertically movable gage-bar, and a scale actuated by said gage-bar, of a vertically slidable bar disposed above and in line with said gage-bar, and means for applying a constant and unvarying multiplied endwise pressure to said vertically slidable bar to force the gage-bar onto the test sample.

5. In an instrument for measuring hardness and resiliency, the combination with a micrometer having an anvil to support a test sample, a vertically movable gage-bar, and a scale for measuring the extent of movement of said gage-bar, of a vertically slidable rack-bar disposed above and in line with said gage-bar, a weight, and connections from said weight to said rack-bar for depressing the latter by the gravity effect of said weight.

6. In an instrument of the character described, the combination with a micrometer having an anvil to support a test sample, a vertically movable gage-bar, and a scale actuated by said gage-bar, of a vertically slidable rack-bar disposed above and in line with said gage-bar, a quadrant geared to said rack-bar, a cord attached at one end to the periphery of said quadrant, a guide for said cord, and a weight attached to the other end of said cord.

7. In an instrument of the character described, the combination with a micrometer having an anvil to support a test sample, a vertically movable gage-bar, and a scale actuated by said gage-bar, of a vertically slidable rack-bar disposed above and in line with said gage-bar, a pivoted quadrant geared to said rack-bar, a cord attached at one end to the periphery of said quadrant, a guide for said cord, a weight attached to the other end of said cord, and means for supporting said weight in idle position.

8. In an instrument of the character described, the combination with a micrometer having an anvil to support a test sample, a vertically movable gage-bar, and a scale actuated by said gage-bar, of a vertically slidable rack-bar disposed above and in line with said gage-bar, a pivoted quadrant geared to said rack-bar, a cord attached at one end to the periphery of said quadrant, a guide for said cord, a depending weight attached to the other end of said cord, removable means for supporting said weight in elevated idle position, and a bracket for supporting said quadrant in idle position.

STANLEY W. WIDNEY.